United States Patent [19]

Yoshida

[11] 4,295,120
[45] Oct. 13, 1981

[54] PATTERN DATA PROCESSING METHOD AND APPARATUS TO PRACTICE SUCH METHOD

[75] Inventor: Hajime Yoshida, Tokyo, Japan

[73] Assignee: Hajime Industries Ltd., Tokyo, Japan

[21] Appl. No.: 69,911

[22] Filed: Aug. 27, 1979

[30] Foreign Application Priority Data

Aug. 28, 1978 [JP] Japan ................................ 53/104554

[51] Int. Cl.$^3$ ............................................. G06K 9/46
[52] U.S. Cl. ................... 340/146.3 MA; 340/146.3 Y
[58] Field of Search ............. 340/146.3 MA, 146.3 Y, 340/146.3 AG, 146.3 R, 347 DD; 358/260

[56] References Cited

U.S. PATENT DOCUMENTS

| | | | |
|---|---|---|---|
| 3,522,586 | 8/1970 | Kiji et al. .................. | 340/146.3 MA |
| 3,634,823 | 1/1972 | Dietrich et al. .......... | 340/146.3 MA |
| 3,805,239 | 4/1974 | Watanabe .................. | 340/146.3 MA |
| 3,868,635 | 2/1975 | Shah et al. .................... | 340/146.3 Y |
| 3,968,475 | 7/1976 | McMahon .................... | 340/146.3 Y |
| 3,980,809 | 9/1976 | Cook ................................ | 358/260 |
| 4,014,000 | 3/1977 | Uno et al. ................ | 340/146.3 MA |

Primary Examiner—Leo H. Boudreau

[57] ABSTRACT

A screen is formed of a plurality of picture elements arranged in horizontal and vertical direction. The screen is consecutively scanned by a photo sensor while a pattern to be recognized is projected onto the screen, or is placed therein. The screen is divided into small picture frames containing at least two each horizontal and vertical neighboring picture elements which total a minimum of $2\times 2=4$ picture elements. The output of the photo sensor is supplied to a delay means which is controlled so that the data of the plurality of small picture frames is obtained, and then processed for segregation by difference of type so that the peculiar data corresponding to the pattern projected or placed onto the screen is obtained.

2 Claims, 18 Drawing Figures

Table I

| Horizontal \ Vertical | 1 | 2 | 3 | 4 | 5 | 6 | 7 | 8 | 9 |
|---|---|---|---|---|---|---|---|---|---|
| 1 | S1 | S12 | S4 | S4 | S4 | S4 | S4 | S10 | S1 |
| 2 | S1 | S6 | S15 | S3 | S3 | S3 | S3 | S9 | S1 |
| 3 | S1 | S6 | S5 | S1 | S1 | S1 | S1 | S1 | S1 |
| ⋮ | ⋮ | ⋮ | ⋮ | ⋮ | ⋮ | ⋮ | ⋮ | ⋮ | ⋮ |
| 9 | S1 | S1 | S11 | S3 | S3 | S3 | S9 | S1 | S1 |

FIG. 5B

Table II

| Horizontal \ Vertical | 1 | 2 | 3 | 4 | 5 | 6 | 7 | 8 | 9 |
|---|---|---|---|---|---|---|---|---|---|
| 1 | S1 | S12 | S4 | S4 | S4 | S4 | S4 | S10 | S1 |
| 2 | S1 | S11 | S3 | S3 | S3 | S14 | S2 | S5 | S1 |
| 3 | S1 | S1 | S1 | S1 | S12 | S13 | S15 | S9 | S1 |
| ⋮ | ⋮ | ⋮ | ⋮ | ⋮ | ⋮ | ⋮ | ⋮ | ⋮ | ⋮ |
| 9 | S1 | S1 | S11 | S3 | S3 | S3 | S9 | S1 | S1 |

FIG. 5C

Table III

| Species | Figure 5 | Figure 3 | Difference |
|---|---|---|---|
| S1 | 34 | 34 | 0 |
| S2 | 0 | 1 | 1 |
| S3 | 11 | 8 | 3 |
| S4 | 11 | 9 | 2 |
| S5 | 3 | 2 | 1 |
| S6 | 5 | 1 | 4 |
| S7 | 1 | 1 | 0 |
| S8 | 2 | 3 | 1 |
| S9 | 3 | 4 | 1 |
| S10 | 4 | 4 | 0 |
| S11 | 3 | 4 | 1 |
| S12 | 2 | 4 | 2 |
| S13 | 0 | 1 | 0 |
| S14 | 0 | 0 | 0 |
| S15 | 1 | 1 | 0 |
| S16 | 1 | 0 | 1 |

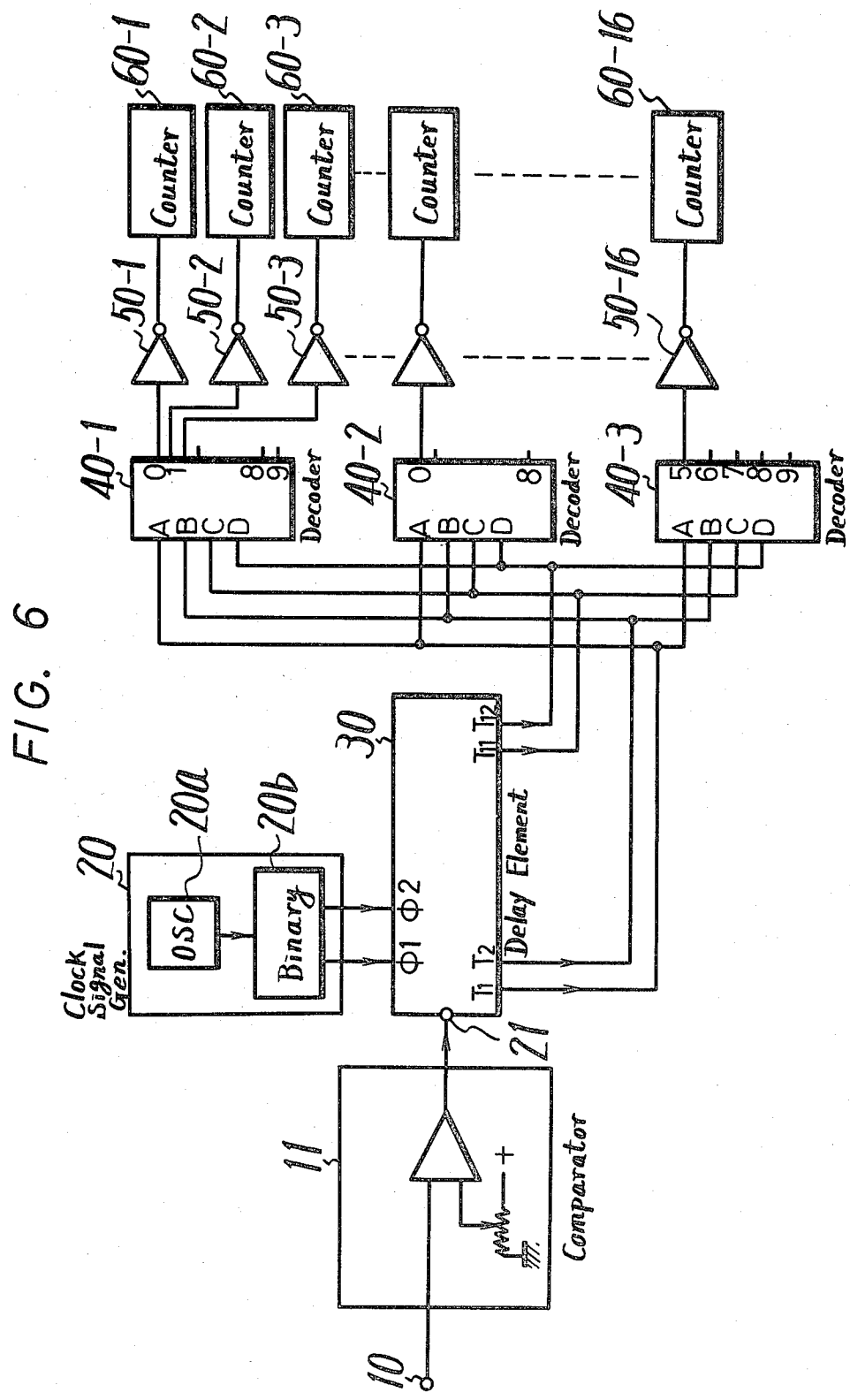

FIG. 7
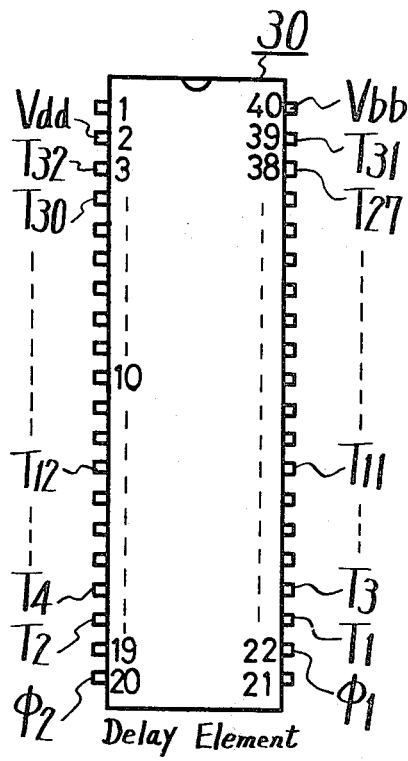
Delay Element
FIG. 8A
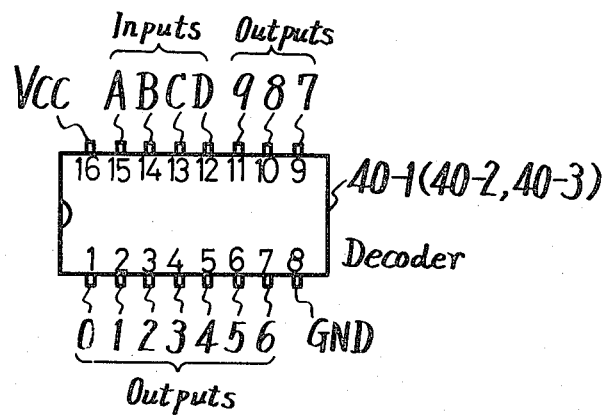
Decoder
FIG. 8B
| SN7442A (40-1) | | SN7443A (40-2) | | SN7444A (40-3) | | Output |
|---|---|---|---|---|---|---|
| DCBA | | DCBA | | DCBA | | 0123456789 |
| LLLL | S2 | LLHH | S4 | | | LHHHHHHHHH |
| LLLH | S13 | | | | | HLH-----H |
| LLHL | S16 | | | | | HHLH----H |
| LLHH | S4 | | | | | HHHLH---H |
| LHLH | S14 | | | | | H--HLH---H |
| LHLH | S6 | | | HHLL | S3 | H---HLH--H |
| LHHL | S8 | | | HHLH | S11 | H----HLHHH |
| LHHH | S12 | | | HHHH | S1 | H-----HLHH |
| HLLL | S15 | HLHH | S10 | HHHL | S9 | H------HLH |
| HLLH | S7 | | | HLHL | S5 | HHHHHHHHHL |

PATTERN DATA PROCESSING METHOD AND APPARATUS TO PRACTICE SUCH METHOD

BACKGROUND OF THE INVENTION

1. Field of the Invention

This invention relates to a pattern data processing method and an apparatus to practice such method, especially a pattern data processing method which uses a scanning type photo sensor and an apparatus to practice such method.

2. Description of the Prior Art

In conventional art of pattern matching, the picture frame on which a pattern to be recognized is projected, is divided into a plurality of vertical and horizontal series of picture elements so that the picture frames are constructed by mesh-like or matrix-like aligned picture elements and such data from these picture elements is processed to conduct pattern matching or pattern recognition.

Further, methods have been already proposed to practice pattern matching by forming small picture frames containing the above mentioned data, 2×2 or 3×3 pieces of picture elements of horizontal as well as vertical structure, and by quantizing such small picture frame data.

However, under conventional technologies, data from one picture frame is placed once into memory and then the data which constructs such small picture frame is extracted to be reprocessed. Accordingly such circuitry construction is complicated, expensive and requires a long processing time which is an important defect.

OBJECT AND SUMMARY OF THE INVENTION

The main purpose of the subject invention is to present a pattern data processing method and such apparatus that circumvents the conventional defect as above mentioned, and to be more specific, to provide a real time processing method of pattern data and such apparatus to practice same.

The method of this invention features a process in which, a screen is formed by placing a plurality of vertical and horizontal series of picture elements. The screen is then divided into small picture frames which contain at least two each vertical and horizontal neighboring picture elements to total 2×2=4 elements. A pattern to be recognized is placed or projected on such mentioned screen and a scanning type photo sensor is used to consecutively scan the screen. The photo sensor output is processed and the photo sensor finishes scanning such above mentioned screen, whereby the segregation by different types of data which correspond to above mentioned small picture frames is simultaneously finished.

Further, the features of the apparatus according to this invention lie in a system that processes pattern data by consecutively scanning a screen by a photo sensor in which a plurality of picture elements in vertical and horizontal series are placed and upon which screen a subject pattern to be recognized is projected. The output from the above mentioned photo sensor is supplied to a delay means which is controlled by a control means to obtain data from a plurality of small picture picture frames that are constructed by at least 2 each vertical and horizontal neighboring picture elements to total 2×2=4 picture elements. The different types of data for such plurality of small picture frames are segregated by a processing means, in order to obtain a peculiar data to the subject pattern that is projected or placed onto the above mentioned screen.

The other objects, features and advantages of the present invention will be apparent from the following description taken in conjunction with the accompanying drawings through which the like reference designate the same elements and parts.

BRIEF DESCRIPTION OF THE DRAWINGS

FIGS. 3A, B, C . . . M, N . . . Z are schematic drawings which illustrate an example of the small picture frames as formed by 4 each picture elements on the screen which contains the multi-picture elements of this invention;

FIGS. 5A and B are charts illustrating the results of the data processed by the method of this invention on a screen as indicated in FIG. 1 above, by placing numbers "5" and "3" on the screen;

FIG. 5C is a chart showing the difference between the type totals of FIGS. 5A and B;

FIG. 6 is a systematic block diagram showing an example system to practice the method of this invention;

FIG. 7 and FIG. 8A are schematic drawings which show a part of a practical example of FIG. 6 respectively;

FIG. 8B is a chart prepared to explain the above.

In the Figures, (1) is the screen, (P1), (P2), . . . (P81) are the small picture frames, (S1), (S2), . . . (S16) are the types of the small picture frames, (10) is the input terminal, (11) is the comparator, (20) is the clock signal generator, (30) is the delay element, (40-1), (40-2), and (40-3) are decoders, (50-1), (50-2), . . . (50-16) are inverters, (60-1), (60-2), . . . (60-16) are counters.

DESCRIPTION OF THE PREFERRED EMBODIMENTS

An example of the method according to the present invention with above mentioned features, will be hereinafter described with respect to the attached drawings.

Figures 1A, 1B:
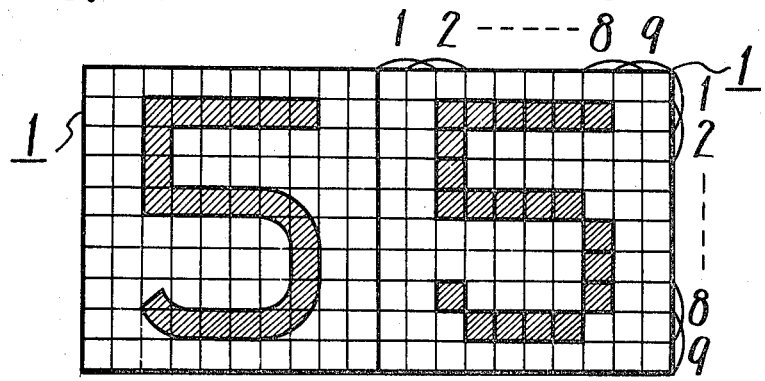
FIGS. 1A and B as well as FIGS. 2A and B are plane views of a screen containing multi-picture elements which are illustrated in order to explain an example of the method according to the present invention.

FIG. 1A is a plane view of screen (1) to which the pattern to be recognized or matched is projected or placed thereon. In this example, screen (1) is constructed by placing a series of white picture elements which are equal in shape and character, for instance 10 vertical picture elements, 10 horizontal picture elements to total 10×10=100 each, in mesh or matrix arrangement, to which the number "5" in black is projected or placed onto as an example of a pattern to be recognized.

Such projected number "5" appears as FIG. 1B on a practical picture frame when described in the two values of white and black.

Figures 2A, 2B:
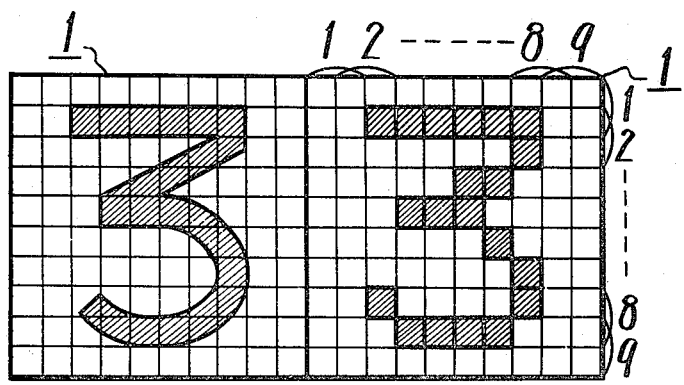

Further, FIGS. 2A and B illustrate the number "3" placed as a pattern to be recognized as projected onto the same screen (1) of FIGS. 1A and B.

Figures 3A, 3B, 3C, 3M, 3N, 3Z:
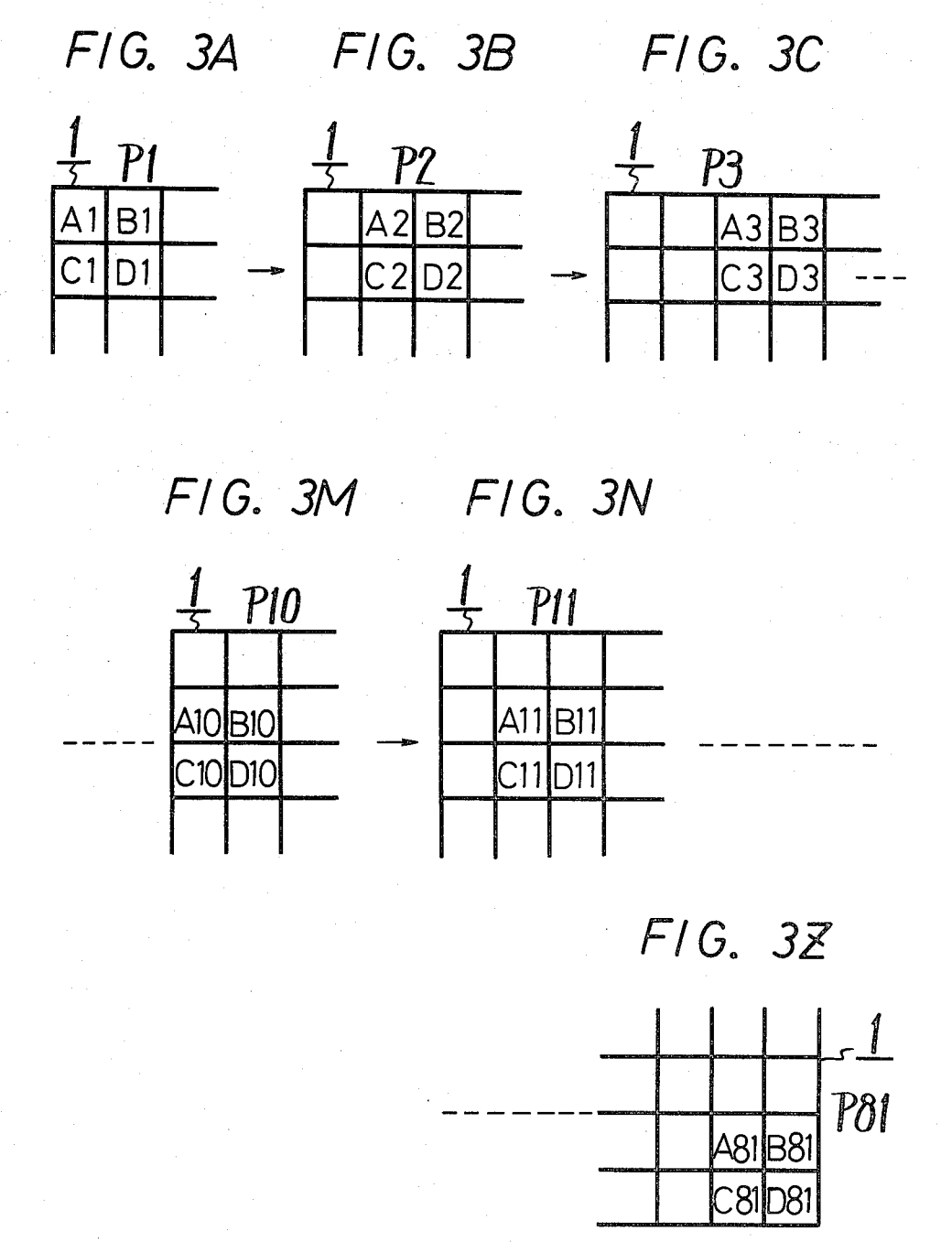

FIGS. 3A, B, C, . . . M and N . . . Z show the above mentioned screen (1) containing 10 each horizontal as well as vertical picture elements which total 100 elements, as divided into small picture elements groups of 2 each neighboring vertical and horizontal picture elements to form small picture element groups (P1), (P2), (P3), ... (P10), (P11) ... (each small picture element is represented as A, B, C and D).

In this case, as shown in FIGS. 3A, B, C, ... M, N, ... Z, the picture element data from screen (1) is processed (described later) in a sequence of, picture element groups (A1, B1, C1, D1) as (P1), (A2, B2, C2, D2) as (P2), ... (A10, B10, C10, D10) as (P10), (A11, B11, C11, D11) as (P11), ... (A81, B81, C81, D81) as (P81).

Now, if each of the picture element groups (A, B, C, D) and their picture data is described by 2 values of white and black, the different types of the picture element groups (A, B, C, D) on screen (1) are 16 types of (S1), (S2), (S3), ... (S16) as shown on FIG. 4.

When the numbers "5" and "3" as shown on FIG. 1B and FIG. 2B are consecutively segregated into small picture element groups (P1), (P2), (P3), ... (P10), (P11) ... (P81) as containing 4 each picture elements as shown on FIGS. 3A, B, C, ... M, N, ... Z and then apply the elements types (S1), ... (S16) in FIG. 4 by obtaining the white and black data to form a chart, Chart I and II as on FIGS. 5A and B are obtained.

Chart III of FIG. 5C is a quantitative distribution chart of small picture element types (S1) ... (S16) of the small picture element groups (P1) ... (P81) from chart I and II of FIGS. 5A and B.

As obvious from the differences on chart III of FIG. 5C, the distribution of the types of the small picture elements (P1) ... (P81) which are formed by 4 picture elements each, are entirely different for the cases between number "5" and "3" and therefore, it is obvious that different numbers can be recognized by processing the small picture element groups (P1) ... (P81) as segregated, which each contain 4 each picture elements by taking 2 each neighboring vertical and horizontal elements to total 4 picture elements per group from among the multi-picture elements of screen (1).

Further, although the above example illustrates numbers as the pattern to be recognized, it is obvious that recognition of the similar nature is possible to other patterns such as charactors, forms and drawings, spectacles, etc.

As the next step, an example of a system to practice the picture data processing method of this invention is described in reference to FIG. 6 through FIG. 8 hereunder.

FIG. 6 is a systematic block diagram example wherein, (10) is the input terminal to which the output of a television camera (not illustrated) as a photo sensor which, for instance photographs screen (1) on which a pattern (5) to be recognized is projected thereon.

The electric data signal which corresponds to the picture image as supplied to the input terminal (10) is fed into the comparator (11) to be converted into white and black 2 value data.

The output signal from the comparator (11) is then supplied to the delay element (30). This delay element (30) may be, as an example, the TAD-32 (with tap) as manufactured by Reticon Corp. of USA as shown on FIG. 7 may be used.

Further, the numbers 1, 2, ... 39, 40 within the block on FIG. 7 are the bin numbers of the picture elements.

To the taps ($\phi$1) and ($\phi$2) of TAD-32 which is used as the delay element (30) herein, by feeding binary clock signals, the analog input signal supplied to bin (21) can be consecutively advanced up to 32 steps (on the example case of FIG. 7) by such clock signal.

Accordingly, as shown on FIG. 6, a binary clock signal generator (20) which consist of an automatic multi-vibrator as an oscillator (20a) and a binary circuitry (20b) is installed and by feeding such binary clock signal to taps ($\phi$1) and ($\phi$2) of the delay element (30), the signal supplied to bin (21) of the delay element (30) from the comparator (11) is consecutively transferred to taps (T1), (T2), ... at a speed as determined by the frequency of the clock signal.

In this case, as above described, screen (1) is formed by $10 \times 10 = 100$ picture elements which are formed into small picture element groups (A, B, C, D) with $2 \times 2 = 4$ each picture elements, in other words, 2 each of the neighboring vertical and horizontal picture elements form small picture element groups (P1), (P2), ... (P81), the signals of taps (T1), (T2), (T11) and T12) are the signals of the small picture element groups.

Accordingly, it is the same as consecutively area scanning the small picture element groups (P1), (P2), .. . (P81) of screen (1).

Further, in this case it is natural that the clock signal frequency be synchronized with the camera scan frequency.

Figure 4:
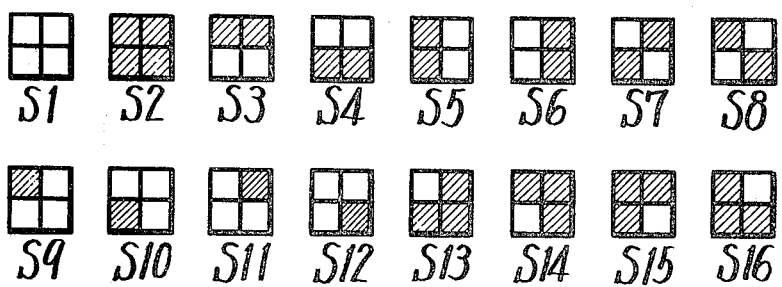
FIG. 4 is a schematic diagram which illustrates the different types of small picture frames as formed by 4 picture elements.

The outputs from taps (T1), (T2), (T11) and (T12) of the delay element (30) are respectively fed into decoders (40-1), (40-2) and (40-3) where the data from the small picture element groups (A1, B1, C1, D1), (A2, B2, C2, D2) ... in other words (P1), (P2), ... are segregated into the types as illustrated on FIG. 4.

FIG. 8A shows an example of the decoder to be used for each decoder (40-1), (40-2) and (40-3) which in this case are products of TI Corp. of USA.

In the examples on the drawing, (A), (B), (C) and (D) show the input terminals whereas on SN7442A which is decoder (40-1) the outputs 0.1-9 are used, on SN7443A which is decoder (40-2), outputs 0 and 8 are used, on SN7444A which is decoder (40-3), outputs, 5, 6, 7, 8 and 9 are used. Further, the numbers 1, 2, ... 15, 16 within the blocks show the bin numbers.

Further, FIG. 8B is the function chart in the case the three SN7442A, SN7443A and SN7444A are respectively used as decoders (40-1), (40-2), and (40-3), by which the 16 black and white patterns as shown on FIG. 4 are segregated.

In other words, the type numbers (S1), (S2), (S3) ... (S16) of the patterns on FIG. 4 match with the number on the type column of the function chart of FIG. 8B.

In this case, (H) is the white picture element of HIGH LEVEL (the pattern is not project thereon) while (L) is the LOW LEVEL (the pattern is projected thereon).

For instance, if the $2 \times 2$ small picture element group (A, B, C, D) is all white, decoder (40-3) which is SN7444A, output 7 (which is bin 9) is L(LOW).

Now, the outputs of decoders (40-1), (40-2) and (40-3) as 0, 1, ... 7, 9 which are related outputs of types (S1) ... (S16) from output bins 1, 2, ... 7, 9, 10, 11 are fed into counters (60-1), (60-2), (60-3), ... (60-16) after passing inverters (50-1), (50-2), (50-3), ... (50-16).

At this point, each counter will count how many of each type of (S1), (S2), ... (S16) small picture element groups existed during 1 scan of the screen.

FIG. 5C Chart III is obtained as an example count result chart of each counter (60-1) ... (60-16).

As above described, according to the method and apparatus under this invention, at the time one scan of the screen or picture image is finished, all of the image data processing or digitalizing is simultaneously finished, whereby the image processing time is drastically shortened compared to the convention methods, while at the same time the construction is simple and the pattern data processing is conducted with precision and accuracy which offer great merit in practice.

Further, while in the above description, this invention was explained by illustrating an example case where the small picture frames are constructed by 2 each vertical and horizontal neighboring picture elements to total 2×2=4 elements from one screen or image, but it is not necessary to confine this invention to small picture frames consisting of 4 vertical and horizontal picture elements, for instance, 2 vertical and 3 horizontal picture elements to total 6 elements, or 3 vertical and 3 horizontal picture elements to total 9 elements may be contained and it is easily understood that the picture element totals of the small picture frames may be adjusted to suit the delicacy of the patterns to be recognized.

It is needless to mention that under such above mentioned arrangements, a sure recognition of the various patterns may be obtained by this invention.

I claim as my invention:

1. Apparatus for processing patent data comprising:
   a photo-electric conversion sensor including a screen on which a pattern to be recognized is applied said screen comprising a plurality of picture elements, said picture elements being divided into a plurality of picture element groups, each of said picture element groups comprising at least two adjacent horizontal and vertical picture elements;
   comparator means for receiving an output signal from said photo-electric conversion sensor and producing white and black two value data signals;
   means for delaying said white and black two value data signals; a clock signal generator means for producing a clock signal and applying said clock signal to said delay means so that said delay means delays said white and black two value signal at a speed equal to the scanning speed of said photoelectric conversion sensor to produce a delayed signal corresponding to each of said plurality of picture element groups;
   a decoder means for decoding said delayed signal from said delay means; and,
   means for counting a signal from said decoder means to produce data corresponding to said picture element groups.

2. A pattern data processing method comprising the steps of:
   arranging a plurality of picture elements in vertical and horizontal directions to form a screen;
   dividing said screen into a plurality of picture element groups, each consisting of at least two adjacent vertical and horizontal picture elements;
   applying a pattern to be recognized on said screen;
   scanning said screen with said pattern by a photoelectric conversion sensor;
   converting an output from said photo-electric conversion sensor into white and black two value data;
   delaying said white and black two value data at a speed equal to the scanning speed of said photoelectric conversion sensor to provide a delayed signal corresponding to each of said plurality of picture element groups;
   decoding said delayed signal; and,
   counting said decoded signal to produce data corresponding to said plurality of picture element groups, wherein when said photo-electric conversion sensor finishes its scanning of said screen, and the processing data corresponding to all of said plurality of picture element groups are simultaneously provided.

* * * * *

UNITED STATES PATENT AND TRADEMARK OFFICE
CERTIFICATE OF CORRECTION

PATENT NO. : 4,295,120
DATED : October 13, 1981
INVENTOR(S) : HAJIME YOSHIDA

It is certified that error appears in the above-identified patent and that said Letters Patent are hereby corrected as shown below:

Claim 1, column 5, line 23: change "patent" to

--pattern--.

Signed and Sealed this

Fourth Day of October, 1988

Attest:

DONALD J. QUIGG

*Attesting Officer*　　　*Commissioner of Patents and Trademarks*